Aug. 18, 1959     E. E. WAGNER     2,900,060
VARIABLE SPEED CONSTANT TORQUE FLUID DRIVE
Filed Aug. 24, 1955     5 Sheets-Sheet 1

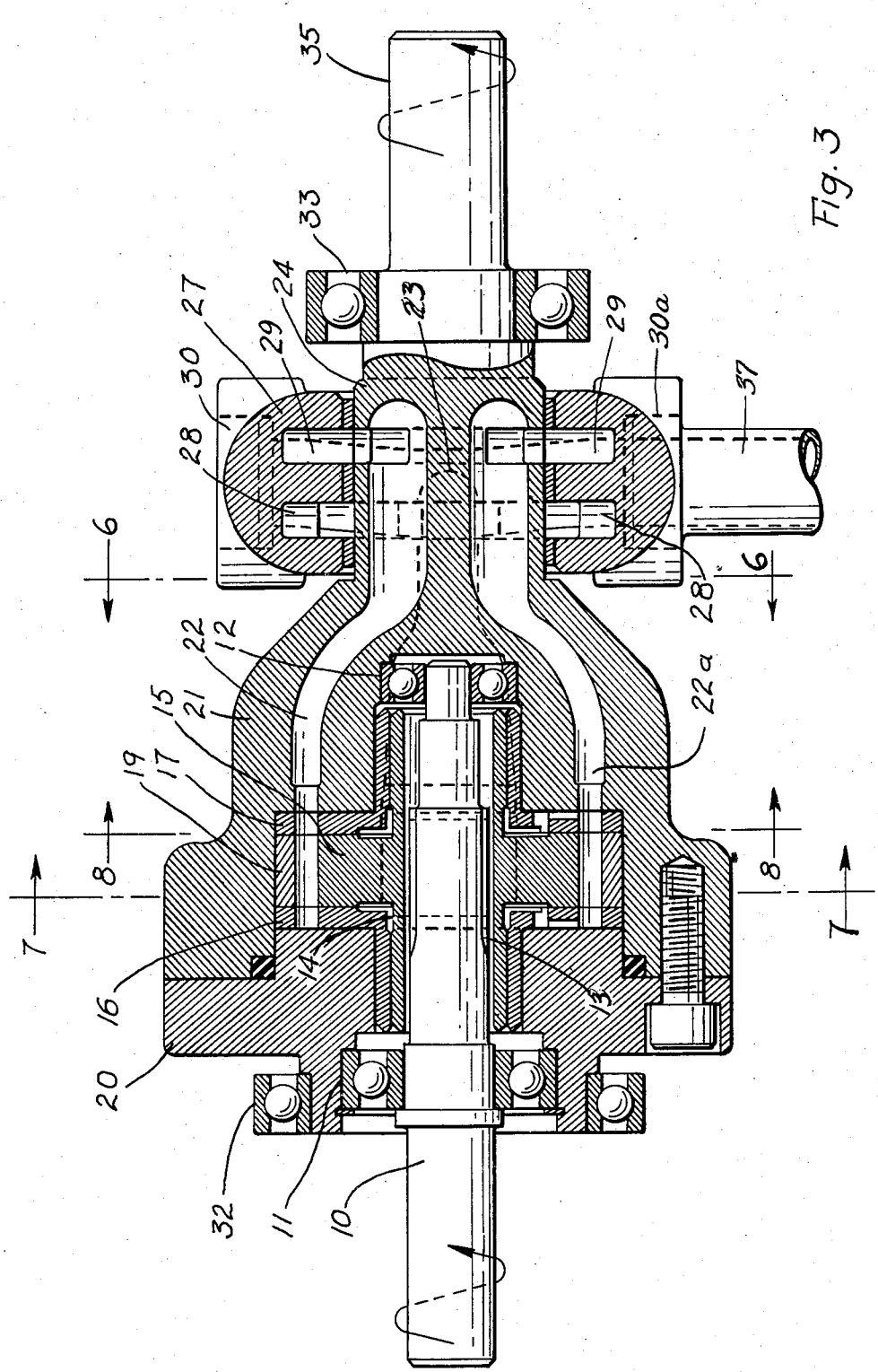

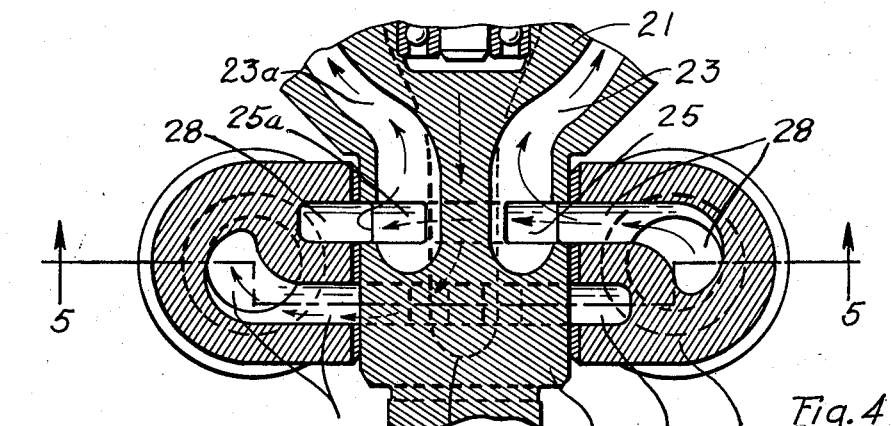
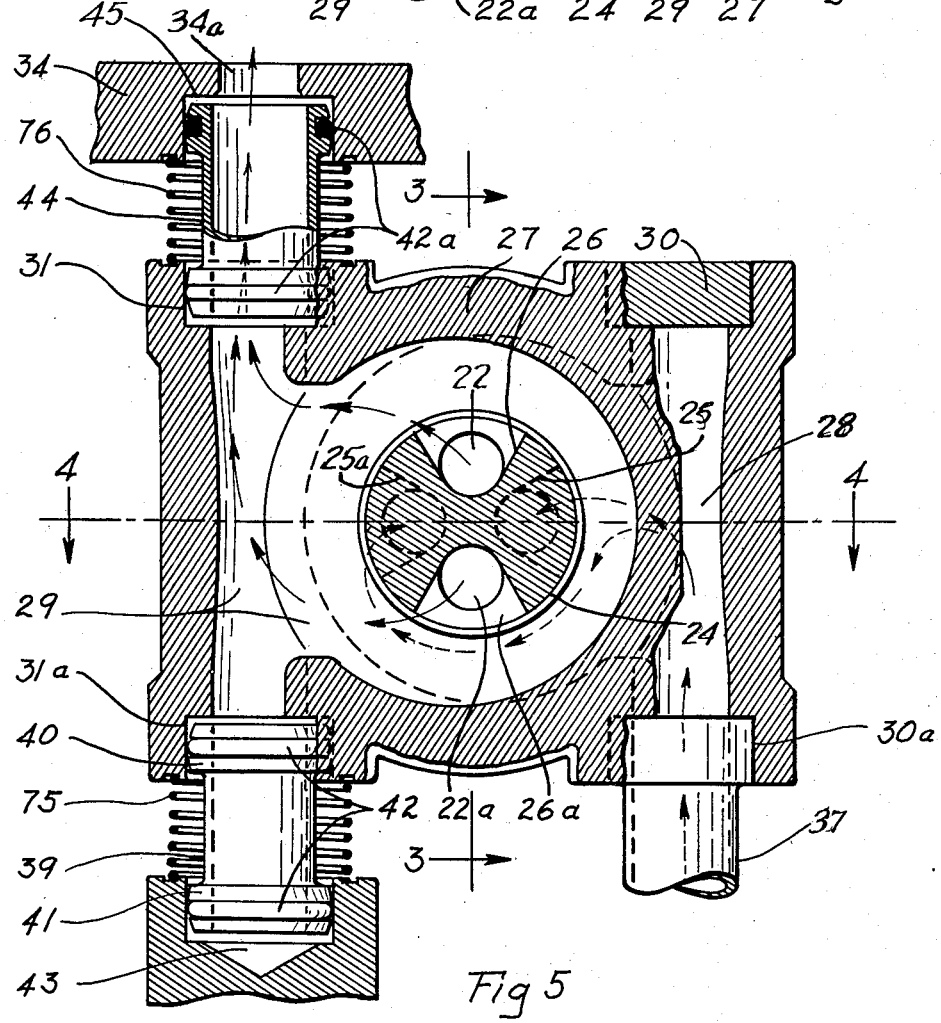

Aug. 18, 1959 E. E. WAGNER 2,900,060
VARIABLE SPEED CONSTANT TORQUE FLUID DRIVE
Filed Aug. 24, 1955 5 Sheets-Sheet 5

United States Patent Office 2,900,060
Patented Aug. 18, 1959

2,900,060

VARIABLE SPEED CONSTANT TORQUE FLUID DRIVE

Ernest E. Wagner, Santa Ana, Calif.

Application August 24, 1955, Serial No. 530,307

10 Claims. (Cl. 192—58)

This invention relates to a constant torque hydraulic drive employing a positive displacement rotary pump, which under certain conditions may and does perform the function of a hydraulic clutch.

An essential object of the invention is to provide a unit in which all of the individual elements are inherently balanced and the axis of rotation of each coincides with the common axis of rotation in order to prevent imbalance at high rotative speeds and wear induced by large centrifugal forces.

A further and important object of this invention is to provide a variable speed device in which the flow of fluid through the unit is proportional to the difference between the input and output speeds.

Another object of the invention is to provide, in a unit of this type, a means for conducting fluid flow to one or more devices and returning it in a continuous circuit; one of the devices being adapted to regulating the speed.

An additional object is to provide a means for conducting fluid to and from the unit, in which the forces due to fluid pressure are fully balanced, thereby permitting the clearances between said means and cooperating parts to function as true capillary seals without the added burden of sustaining hydraulically induced loads.

In devices of a similar nature, wherein fluid under pressure is conducted to and from a non-rotating element, surrounding a rotating member, rigid adjuncts are employed which produce undesirable strains and also impede minute movements of the element due to temperature variations, bearing eccentricities and unavoidable manufacturing tolerances; and therefore an additional and essential object of the invention is to provide compact flexible connections which eliminate these undesirable effects and so reduce resistance to elastic deformation under minute movements and the space required for their application as to be negligible.

A further object of the invention is to provide a device of the character referred to which is of great simplicity, ease of manufacture, assembly and replacement of worn parts.

Rotors of conventional devices based on fluid displacement which rotate in close proximity to their housings, keep the rotor reasonably centered axially within the housing by depending upon flat surfaces under static lubrication, notwithstanding its low bearing capacity, high friction and easy galling tendency, and therefore another and important additional object of this invention is to provide means whereby centering of the rotor is accomplished by hydrodynamic means, thereby taking advantage of its attendant high load carrying capacity and self centering characteristics when applied to adjacent ends of a rotor.

Other objects and advantages will become apparent from the following description in connection with the accompanying drawings, in which Fig. 1 is a cross section of a variable speed unit and its housing on line 1—1 of Fig. 2.

Fig. 3 is a longitudinal section through the variable speed unit on line 3—3 of Fig. 5.

Fig. 4 is a horizontal cross section of the rotary distributor on line 4—4 of Fig. 5.

Fig. 5 is a vertical cross section of the rotary distributor on line 5—5 of Fig. 4.

A variable speed drive of the type shown, Figs. 1—2—3—7, consisting of an input end 10, an output end 35—the two mounted coaxially so that each is free to rotate independently of the other—and fluid inlet-outlet means 24—27, is in fact a differential pump or differential hydraulic motor depending upon the speed relationship between input and output ends; and this drive at times may and does function as a hydraulic clutch.

Figure 1:
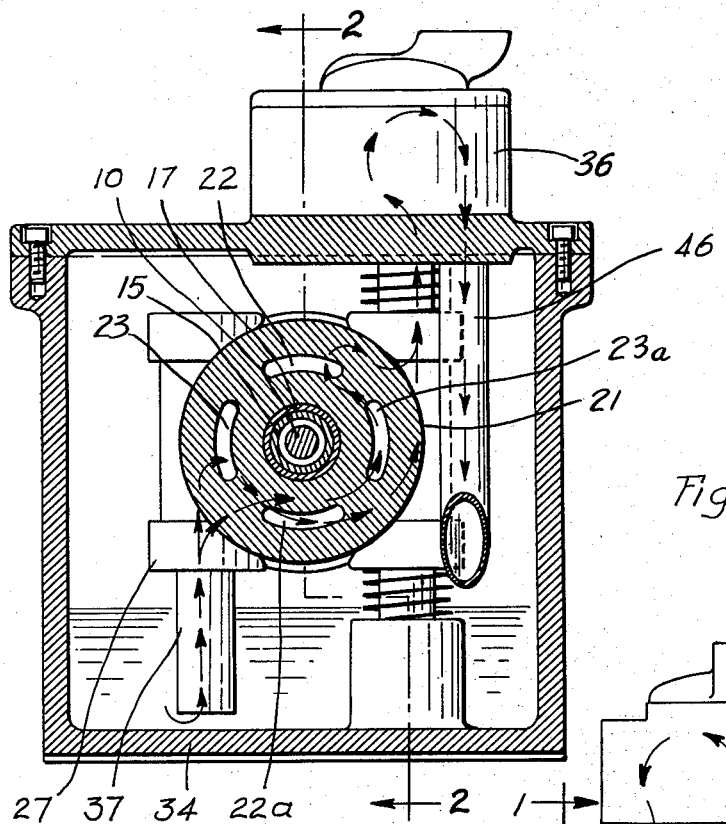
Figure 2:
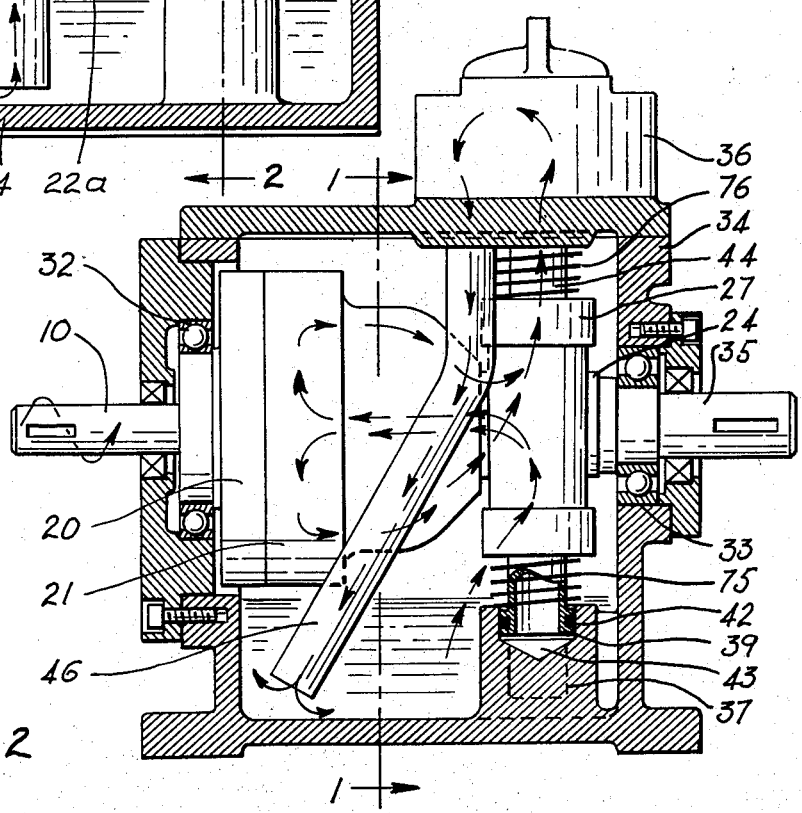
Fig. 2 is a cross section on line 2—2 of Fig. 1 through the outer housing only, in order to show the variable speed unit and accessories in their entirety in position relative to the housing.
Figure 6:
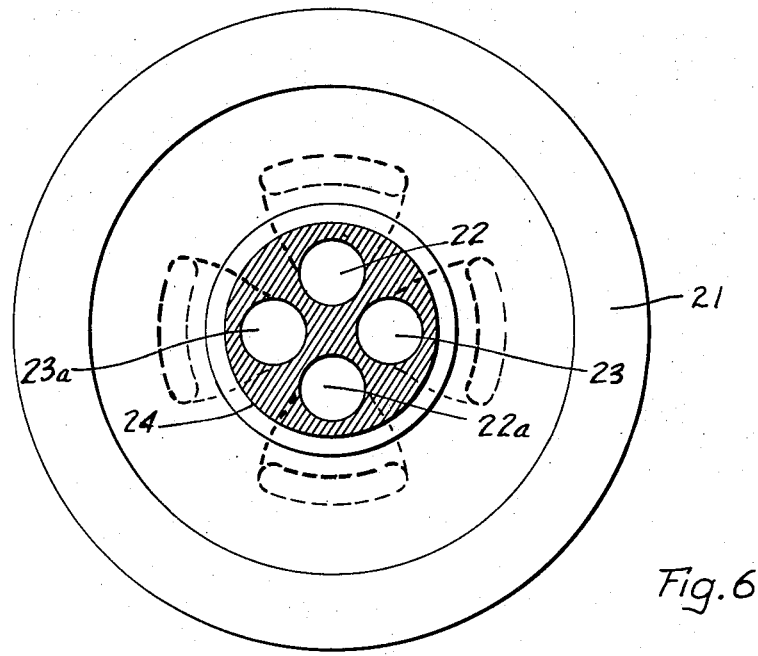
Fig. 6 is a cross section through the variable speed unit on line 6—6 of Fig. 3.

It is self-evident that the variable speed drive of Fig. 3 will run 1:1—output speed equals input speed—if no fluid is permitted to leave or enter. If a volume of fluid equal to the volume displaced by the unit in 500 revolutions of relative movement between rotor and housing is metered out per minute by means insensitive to pressure variations, then the output shaft will run 500 r.p.m. slower than the input shaft. Such an arrangement is shown in Figs. 1 and 2, using a standard commercial type pressure compensated flow control valve 36 for controlling the output speed.

Figure 7:
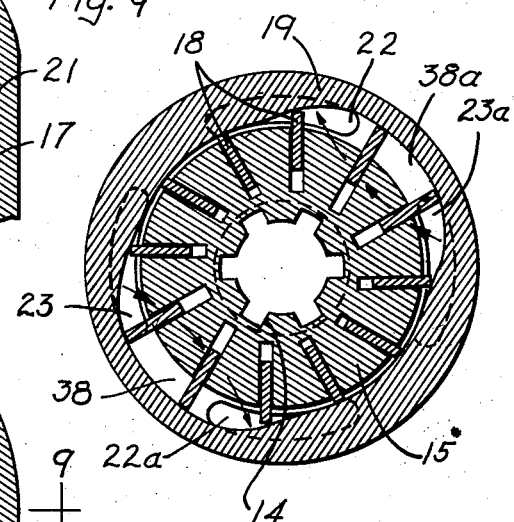
Fig. 7 is a cross section through the unit on line 7—7 of Fig. 3, housing and drive shaft omitted.

My invention comprises an input shaft 10 carried in antifriction bearings 11—12 supported in a two-piece housing 20—21, Fig. 3, said shaft provided with splines 13, for driving mating splines 14, Fig. 7, in a rotor 15. The rotor in combination with end plates 16—17, vanes 18 and cylinder 19 comprises a conventional balanced cartridge type pump, which assembly is mounted as a unit in a housing consisting of coverplate 20 and body 21 having suitable fluid conducting passageways 22—22a, 23—23a, and terminating in an integral pintle 24 provided with intake ports 25—25a, and outlet ports 26—26a, Figs. 4-5.

A stationary body 27 is mounted upon and surrounds the rotatable pintle 24 and cooperates therewith to form a rotary distributor, the funtion of which is merely to facilitate a continuous and uninterrupted transference of fluid from the passageways in the rotating pintle to the stationary conduits coming from and leading to the reservoir. For this purpose the distributor body 27 is provided with an intake port 28 and outlet port 29, these ports adapted to register or mate respectively with the ports 25—25a, and 26—26a of the pintle. The distributor body or housing is provided with inlets 30—30a and outlets 31—31a, Fig. 5.

The complete unit is free to rotate upon concentrically mounted bearings 32—33 supported by suitable means such as a housing 34 and the integral extension of the pintle serves as the output shaft 35.

Upon driving the input shaft 10 in the direction of the arrow at a speed sufficiently high to throw vanes 18, under the action of centrifugal force, against the inner surface of the cylinder 19, fluid is drawn in from the reservoir in the housing 34 via suction pipe 37, inlet 30a—inlet 30 has been plugged—inlet port 28 in the distributor body and inlet ports 25—25a in the pintle, fluid passageways 23—23a and endplate 17 into the vane pockets 38—38a, thence transported by rotor 15 to passageways 22—22a, Fig. 7, which terminate in the pintle 24, and there expelled through ports 26—26a in the pintle to port 29 in the distributor body 27 to outlets 31 and 31a.

Outlet 31a contains a flexibly mounted tubular fitting 39 possessing spherically shaped ends 40—41 which may have O rings 42 in suitably shaped grooves, the fitting 39 terminating in a blind hole 43.

Outlet 31 contains a flexibly mounted tubular fitting 44 which is identical in design to fitting 39 and which terminates in a recess 45 in the housing 34.

As the passageway through outlet 31a and fitting 39 terminates in a blind hole 43, fluid is forced to flow through the outlet 31, fitting 44, a suitable hole 34a in housing 34, flow control valve 36 and the return tube 46 back to the reservoir in the housing 34.

Upon regulating the flow control valve 36 presently described in detail, from fully closed to fully open, the speed of the output shaft 35 will vary from full speed—equal to the input speed—to fully stopped (provided the valve has sufficient capacity), in increments proportional to the setting of the flow valve, while the input shaft 10 is rotating continuously at full speed.

In order to maintain a constant rate of fluid flow through the unit, regardless of the rate selected and unaffected by variations in pressure, which are a function of the load on the output shaft, valve 36 is provided and arranged with manually adjustable means for selecting any volume of fluid flow desired within its capacity. These adjustable, pressure compensated, flow control valves meter out larger or smaller volumes depending upon the valve setting selected, and maintain the selected rate of fluid flow constant, regardless of pressure fluctuations, in a manner well known in the art; this in turn causes the r.p.m. of the unit to decrease or increase—inversely proportional to the flow rate—and the velocity of the oil through the unit to increase or decrease—proportional to the flow rate.

Attention is also directed to the distributor 27 and its ports 28 and 29 which are axially spaced relative to each other. The ports constitute the means by which fluid may flow continuously and uninterruptedly to and from the two sets of rotating passageways 22—22a and 23—23a, Fig. 6. By reason of said ports, said passageways are, in effect, continuous with two stationary conduits 37 and 44, the former leading from the reservoir and the latter leading to the reservoir via the hole 34a, the valve 36 and the conduit 46, regardless of the rate of rotary motion existing between the distributor body 27 and the pintle 24 in response to the speed selected.

It will be noted that the action of both the distributor 27 and of the valve 36 is separate and independent of the other and that the two have no interaction.

As an illustration of a standard, pressure compensated, flow control valve, which may be employed, the following is a description of a Vickers adjustable flow control valve with pressure compensation as regularly built, for the past several decades, by Vickers Inc., 1400 Oakman Blvd., Detroit 32, Michigan.

Figure 10:
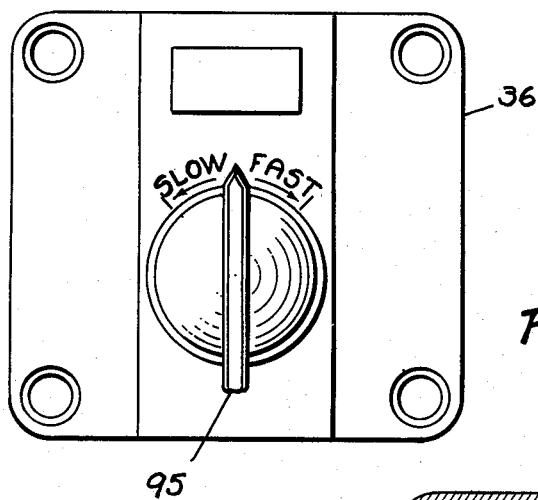
Fig. 10 is a plan view of a pressure compensated flow control valve.
Figure 11:
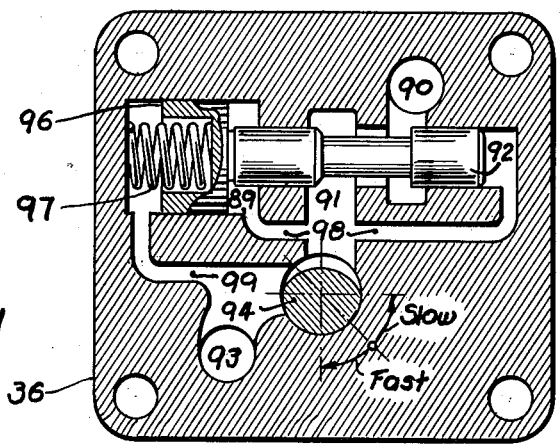
Fig. 11 is a section through the valve on line 11—11 of Fig. 12.
Figure 12:
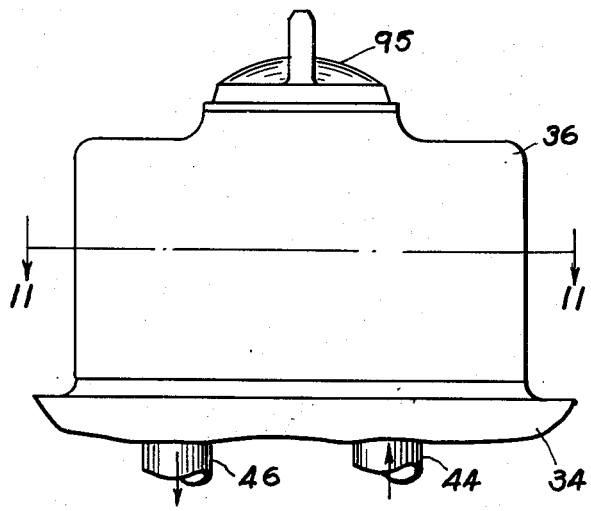
Fig. 12 is a side view of the valve.

Valve 36, Figs. 10, 11 and 12, functions in such a manner so as to hold a selected volume of fluid flow constant, regardless of pressure fluctuations on the inlet side, on the outlet side or on both the inlet and outlet sides of the valve and operate effectively as long as there is a small differential in pressure between inlet and outlet, generally about 15 p.s.i.

Compensation for pressure is effected in the following manner: Fluid enters the valve 36 from the distributor 27 via fitting 44 and passageway 90, Fig. 11, in communication with the hole 34a in the housing 34, Fig. 5. Inlet 90 communicates with chamber 91 via the annular space formed by the neck of the slidably fitted spool 92 and its bore in the valve housing. Interposed between chamber 91 and outlet 93 is a cam 94, which may be manually rotated by means of the control knob 95 and thereby vary the area of the orifice formed between cam 94 and the housing 36.

One end of the spool 92 is enlarged as at 96 to receive a spring 97. Passageways 98 convey fluid pressure from the chamber 91 to the small end of the spool 92 and to the annular space 89 formed by the small and large diameters of the spool. A further passageway 99 leads from the outlet chamber 93 to the large end 96 of the spool. It is evident that the area of the large spool end is equal to the area of the annular space 89 plus the area of the small end of the spool 92.

The equal and opposing spool areas, the spring and the cam co-operate to effect the requirement of adjustable flow, held constant, regardless of pressure variations, to wit: Assuming that outlet 93 leads via conduit 46 to the reservoir of Fig. 2, then the pressure in the outlet chamber 93 is for all practical purposes atmospheric and constant. Furthermore the valve spool 92 in the absence of fluid pressure will be forced to the right, due to the action of the spring, so that the annular passageway from 90 to 91 is open to unobstructed fluid flow. Fluid upon entering chamber 90 flows to chamber 91, past the orifice formed by cam 94, into outlet chamber 93 and from there to the reservoir. As the flow is increased the critical cross section, i.e., the cam orifice, will cause pressure to build up in the fluid in chamber 91, the passageways 98 will transmit it to the spool areas opposing the spring action and thereby start the spool moving to the left, compressing the spring. This movement will continue until the pressure in chamber 91 exceeds that in the outlet 93 by an amount sufficient to balance the force of the spring 97.

Once a balance has been effected, then any increase in pressure in the inlet 90 will force the spool to close enough, against the action of the spring, to hold the pressure in the chamber 91 from increasing and thereby maintain a constant differential between chambers 91 and 93. Should the pressure increase in the outlet 93, the spool will then be forced to open enough to increase the pressure in chamber 91 until the pressure differential, required by the spring, is restored between the chambers 91 and 93.

With a constant pressure differential across the orifice of the cam assured, the volume of fluid passing the orifice will be proportional to the area of the orifice. Regulation of the cam by means of the control knob 95, controls fluid flow, uneffected by pressure variations. The control knob may be graduated in percent of full speed, in r.p.m. or any other convenient system, such as speed in ft. per minute. Closing the orifice, as indicated in Fig. 11, increases the speed of the output shaft and vice versa, for the reasons hereinbefore explained, and graduations must be made with this in mind.

The arrows indicate fluid flow in accordance with the foregoing description.

Fitting 39 permits hydraulic fluid to enter the blind hole 43 in the housing 34. The pressure reaction against the housing effectively offsets the reaction due to the pressure of the hydraulic fluid leaving the valve body 27 through the fitting 44, whereas the O rings 42—42a permit minute movement of the distributor relative to the housing in any direction by flexing slightly, that is, by elastic deformation only, not by sliding.

Helical springs 75—76 maintain the position of the distributor body 27 relative to the housing 34 under the action of viscous shear forces in the capillary seal between the distributor 27 and the pintle 24, due to the latter's rotation. The helical springs do not interfere with minute movements of the distributor as they also are able to flex minutely in all directions with only negligible resistance.

Should a reversing drive be required then the openings 30—30a must also be provided with duplicates of fittings 39 and helical springs 75.

Figure 9:
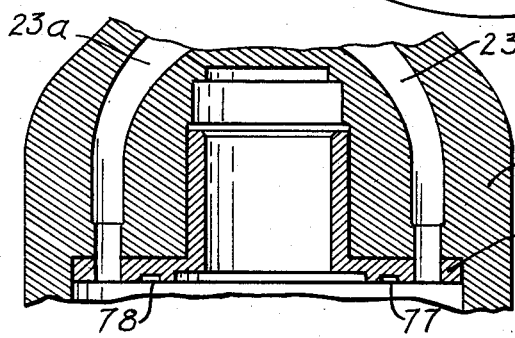
Fig. 9 is a fragmentary cross section on line 9—9 of Fig. 8.
Figure 8:
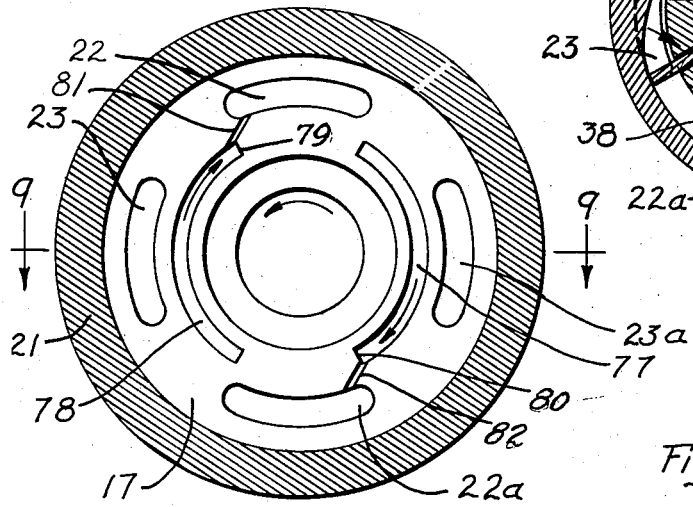
Fig. 8 is a cross section through the unit on line 8—8 of Fig. 3 after removing rotor and drive shaft.

Referring more particularly to Figs. 8–9: Concentric grooves or pockets 77—78 are let into the face of the end plate 17 and its opposing end plate 16, Fig. 3. Between the end plates 16 and 17 runs the rotor 15 with a close running clearance on the order of .0005" to .001" per side. The sides or ends of the rotor cover the tapering pockets 77—78. (The pockets 77—78 do not show in Fig. 3. Section 3—3 is taken at 90° to the section of Fig. 9, and passes between the ends of the pockets of Fig. 8.) The maximum depth of the pockets is on the order of a few .001" and therefore cannot be shown unless grossly exaggerated; the pockets shown in Fig. 9 merely indicate the location of the actual pockets and are not to be considered as representative of their true proportions. The arrows in the pockets indicate the direction in which the bottoms slope minutely, beginning flush with the surface of the end plate and ending with their greatest depth at the points 79—80, at which points fluid is introduced to the pockets from the ports 22—22a via ducts 81—82. The bottoms of the pockets must form true planes inclined minutely with respect to the faces of the end plates and rotor and are preferably smoothly finished. These pockets form wedge-shaped films of fluid and the direction of their slope must always be such that fluid will be drawn into the wedge-shaped pockets or scoops by the relative movement between endplate and rotor and furthermore they must be of such proportions so as to obey the laws of Reynold's hydrodynamic theory of lubrication, in accordance with which pressure is produced in a wedge shaped film of fluid under the action of the viscous shear forces. The wedge shaped pockets at opposite ends or sides of the rotor must be so proportioned and must be so located that the resultant of the forces generated by the fluid wedges at one end of the rotor are equal, opposed and co-axial to the resultant of the opposing fluid wedges, so as to balance when the rotor is accurately centered.

In practice, with properly proportioned pockets and the rotor accurately centered, the forces of any pair of opposed fluid wedges cancel, but as the rotor drifts minutely to one side or the other of center, due to some unbalancing force, it approaches one end plate more closely, which action automatically builds up an increasing force in the fluid wedges approached and effectively opposes further advancement. The opposing force of the opposite fluid wedges from which the rotor face moves away, rapidly decreases, which circumstance substantially adds to the total force available opposing any drifting of the rotor from its centered position. The rotor is forced to float axially, back and forth, until all axial forces balance, which should, if no external thrust acts on the rotor through the shaft, place it nearly central of its housing with the clearances divided approximately even, ½ on one side and ½ on the other side of the rotor.

The dynamic forces in the fluid wedges become very great, increasing several hundred fold as the rotor moves from its centered position and approaches an end plate closer and closer. They constitute a very effective means of centering the rotor and preventing it from making metallic contact with its end plate.

Should the rotor be required to reverse its direction of rotation or should its relative direction of rotation reverse, then each pocket should have a mating pocket sloping in the opposite direction and each of these additional pockets be provided with a channel connecting its lowest or deepest end to a source of oil for supplying the pockets with fluid as needed.

It is apparent that the relative movement between endplate and rotor determines the hydrodynamic action of the fluid wedges and it is therefore immaterial whether they are in the endplates or in the ends of the rotor, just so they are located between adjacent sliding surfaces and fully covered so as to completely enclose the wedge shaped space and, thereby, prevent fluid from escaping along the sides of the wedge shaped pockets.

I claim:

1. In a fluid transmission of the character referred to, means to define a reservoir for a fluid, bearing means, a housing mounted for rotation in said bearing means, a drive shaft concentric with said housing, bearings in said housing for said shaft, balanced rotary pump means of the vane type connected with said shaft to rotate therewith, said housing surrounding and rotatable relative to and independently of said pump means and provided with inlet-outlet passageways in communication with said pump means and terminating in inlet and outlet ports, said ports being axially spaced in a diametrically diminished journal portion of said housing, said housing being provided with an output shaft coaxial with said input shaft, a stationary body associated with said housing and provided with inlet-outlet ports arranged to mate with said axially spaced inlet-outlet ports in said housing, a conduit leading from said reservoir to the inlet ports in said body and housing, pressure compensated flow control means, a conduit leading from said outlet ports to said pressure compensated flow control means for metering out a definite volume of fluid from said pump means and thereby governing the speed of said output shaft, and a conduit leading from said flow control means to said reservoir.

2. In a fluid transmission of the character referred to including means to define a reservoir, a drive shaft, balanced rotary pump means of the vane type associated with said shaft to rotate therewith, a housing surrounding and rotatable relative to and independently of said pump means and provided with two pairs of fluid conducting passageways, said housing terminating in a diametrically reduced journal portion provided with two intake ports axially spaced from two outlet ports and having an extension forming an output shaft co-axial with said drive shaft, said intake ports and said outlet ports communicating with said passageways and with said pump means, a stationary body mounted upon said journal portion and provided with inlet-outlet ports adapted to mate with said inlet-outlet ports in said journal portion, pressure compensated flow control valve means for selecting the speed of said output shaft, and conduit means to conduct fluid from said reservoir to said stationary body, from said body to said valve means and from said valve means to said reservoir.

3. In a fluid transmission of the character referred to comprising balanced vane type pump means, a drive shaft on which said pump means is mounted to rotate therewith, a housing enclosing said pump means and rotatable independently thereof, said housing having a diametrically diminished end defining a journal portion provided with multiple inlet ports axially spaced from multiple outlet ports and having an extension forming an output shaft co-axial with said drive shaft, said housing and said journal portion having multiple inlet and multiple outlet passageways interconnecting said pump means and said journal ports, a body stationarily mounted upon and surrounding said journal portion and having axially spaced passageways and ports to mate with said journal ports, means to form a reservoir, a conduit leading from said reservoir, a conduit leading to said reservoir, said passageways in said pintle and housing being substantially continuous with said conduits, coaxially disposed antifriction bearings upon which said drive shaft and rotatable housing are free to rotate, and pressure-compensated flow control valve means included in said conduit leading to said reservoir, said valve means being adjustable for varying the volume of fluid metered from said pump means and thereby regulate the speed of said output shaft.

4. In a fluid transmission of the character referred to, a rotatable housing, balanced vane type pump means disposed within said housing and driven by a central drive shaft, said housing having a diametrically diminished journal portion and an extension forming an output shaft co-axial with said central drive shaft, passage means for interconnecting said pump means, housing and journal portion, a stationary body surrounding said journal portion and cooperating therewith to form a rotary distributor, said body having passage means to mate with the passage means in said journal portion, means to define a reservoir, a conduit for conducting fluid from said reservoir to the passage means in said body and journal portion, a conduit for conducting the fluid displaced by said pump means from said journal and body passage means to said reservoir, and pressure compensated valve means for regulating the volume of fluid displaced by said pump means and thereby controlling the speed of said output shaft, said valve means incorporated in said conduit leading to said reservoir.

5. In a unit of the character referred to, a rotatable housing having a concentric chamber with passageways terminating in a diametrically reduced journal portion, a shaft integral with said journal portion, a distributor on said journal portion having inlet and outlet ports and passageways adapted to mate with said passageways in said journal portion, a fixed housing in which said rotatable housing and distributor are disposed, said fixed housing having an inlet port and an outlet port, a tubular fitting between one of said distributor outlet ports and one of said fixed housing ports, a blind port in said fixed housing, a tubular fitting between said blind port and another distributor outlet port, said tubular fittings being provided with means for permitting movement of said distributor in any direction relative to said fixed housing, resilient means to maintain the position of said distributor relative to said fixed housing, balanced vane type pump means disposed within said concentric chamber, a shaft upon which said pump means is mounted to rotate, said last named shaft being co-axial with said first-named shaft, a reservoir for fluid, a tabular fitting between said reservoir and an inlet port in said distributor, and flow control valve means associated with said housing ports, said valve means being adjustable to regulate the output speed of said unit.

6. In a fluid transmission of the character referred to, means to form a reservoir for fluid, comprising a housing mounted for rotation and having a concentric chamber with two pairs of fluid conducting passageways, said housing having and output shaft and a journal portion the diameters of which are substantially smaller than said housing, said journal portion being provided with two intake and two outlet ports axially spaced and communicating with said passageways, a stationary body cooperating with said journal portion to form a distributor and having inlet and outlet ports to mate with the respective ports in said journal portion, balanced vane type pump means within said housing and chamber, a drive shaft with which said pump means is associated for rotation, the axis of rotation of said housing, output shaft, balanced vane type pump means, and input shaft coinciding with a common axis of rotation, flow control valve means for regulating the speed of said output shaft, and conduits series connecting said reservoir, distributor and flow control valve means to complete the hydraulic circuit.

7. In a mechanism comprising a rotary unit, bearings, a shaft journalled in said bearings, a rotor on said shaft and having parallel end surfaces normal to the axis of rotation, a housing with end plates enveloping said rotor, said end plates being immediately adjacent to and in virtual contact with said end surfaces and having fluid passageways, said end plates having concentric groove-like pockets in the inner faces thereof adjacent to and covered by the end surfaces of said rotor, said pockets having bottoms inclined minutely with respect to said faces and tapering out flush therewith to define wedge shaped pockets receiving for fluid for centering said rotor between said end plates by hydrodynamic action, and ducts for conducting fluid from said passageways to said pockets.

8. In a mechanism comprising a rotary unit, bearings, a shaft journalled in said bearings, a rotor on said shaft and having parallel end surfaces normal to the axis of rotation, a housing with end plates enveloping said rotor, said end plates being immediately adjacent to and in virtual contact with said end surfaces and having fluid passageways, sloping pockets concentrically arranged in the inner faces of said end plates and adjacent to, covered by and separated from the end surfaces of said rotor by an oil film, said pockets originating flush with said faces and sloping minutely into the surface towards their deep ends, said end plates having ducts for conducting fluid from said passageways to the deep ends of said pockets.

9. In a mechanism comprising a rotary unit, bearings, a shaft journalled in said bearings, a rotor on said shaft and having parallel end surfaces normal to the axis of rotation, a housing with end plates enveloping said rotor, said end plates being immediately adjacent to and in virtual contact with said end surfaces and having fluid passageways, hydrodynamic means for centering said rotor between said end plates comprising, sloping concentrically arranged pockets let into said end plates, said pockets' depth increasing substantially proportional to length, from flush with the inner face of said end plates to their deepest ends, to form scoop like pockets open to the oncoming shear transported fluid, and ducts connecting said fluid passageways with the deepest part of said pockets to supply fluid thereto, said pockets being proportioned and positioned so that the resultants of the forces of the pockets in opposing end plates are equal, opposed and substantially coaxial when the rotor is centered.

10. In a fluid transmission of the character referred to, support means adapted to define a reservoir for a fluid, bearing means, a housing mounted for rotation in said bearing means, a drive shaft concentric with said housing, bearings in said housing for said shaft, balanced rotary pump means connected with said shaft to rotate therewith, said housing surrounding and rotatable relative to and independently of said pump means and provided with two pairs of fluid conducting inlet-outlet passageways and with an output shaft co-axial with said input shaft, a stationary body associated with an end of said housing, said body being flexibly connected with said support means and having inlet-outlet ports adapted to mate with the inlet-outlet passageways in said housing and form a rotary distributor, and a suction conduit and a discharge conduit, said conduits being substantially continuous with the inlet-outlet passageways in said end of said rotatable housing and with the inlet-outlet ports in said stationary body.

References Cited in the file of this patent

UNITED STATES PATENTS

| | | |
|---|---|---|
| Re. 20,026 | Thoma | June 30, 1936 |
| 873,978 | Bailey et al. | Dec. 17, 1907 |
| 944,429 | Halstead | Dec. 28, 1909 |
| 1,317,415 | Baker et al. | Sept. 30, 1919 |
| 1,529,061 | Gordon | Mar. 10, 1925 |
| 1,603,179 | Wingquist | Oct. 12, 1926 |
| 1,779,757 | Strecket | Oct. 28, 1930 |
| 2,198,891 | Thoma | Apr. 30, 1940 |
| 2,516,461 | Gleasman | July 25, 1950 |
| 2,581,172 | Carson | Jan. 1, 1952 |

FOREIGN PATENTS

| | | |
|---|---|---|
| 84,282 | Norway | Sept. 20, 1954 |